July 20, 1965 H. W. GRIFFITHS 3,196,206

MAGNETO-OPTICAL TRANSDUCER USING A MAGNETIC THIN FILM

Filed Jan. 9, 1962

INVENTOR:
Henry W. Griffiths
By Smyth, Roston & Pavitt
Attorneys

United States Patent Office 3,196,206
Patented July 20, 1965

3,196,206
MAGNETO-OPTICAL TRANSDUCER USING A MAGNETIC THIN FILM

Henry W. Griffiths, Torrance, Calif., assignor to The Magnavox Company, Torrance, Calif., a corporation of Delaware Filed Jan. 9, 1962, Ser. No. 165,202
11 Claims. (Cl. 178—6.6)

Figures 1, 2:
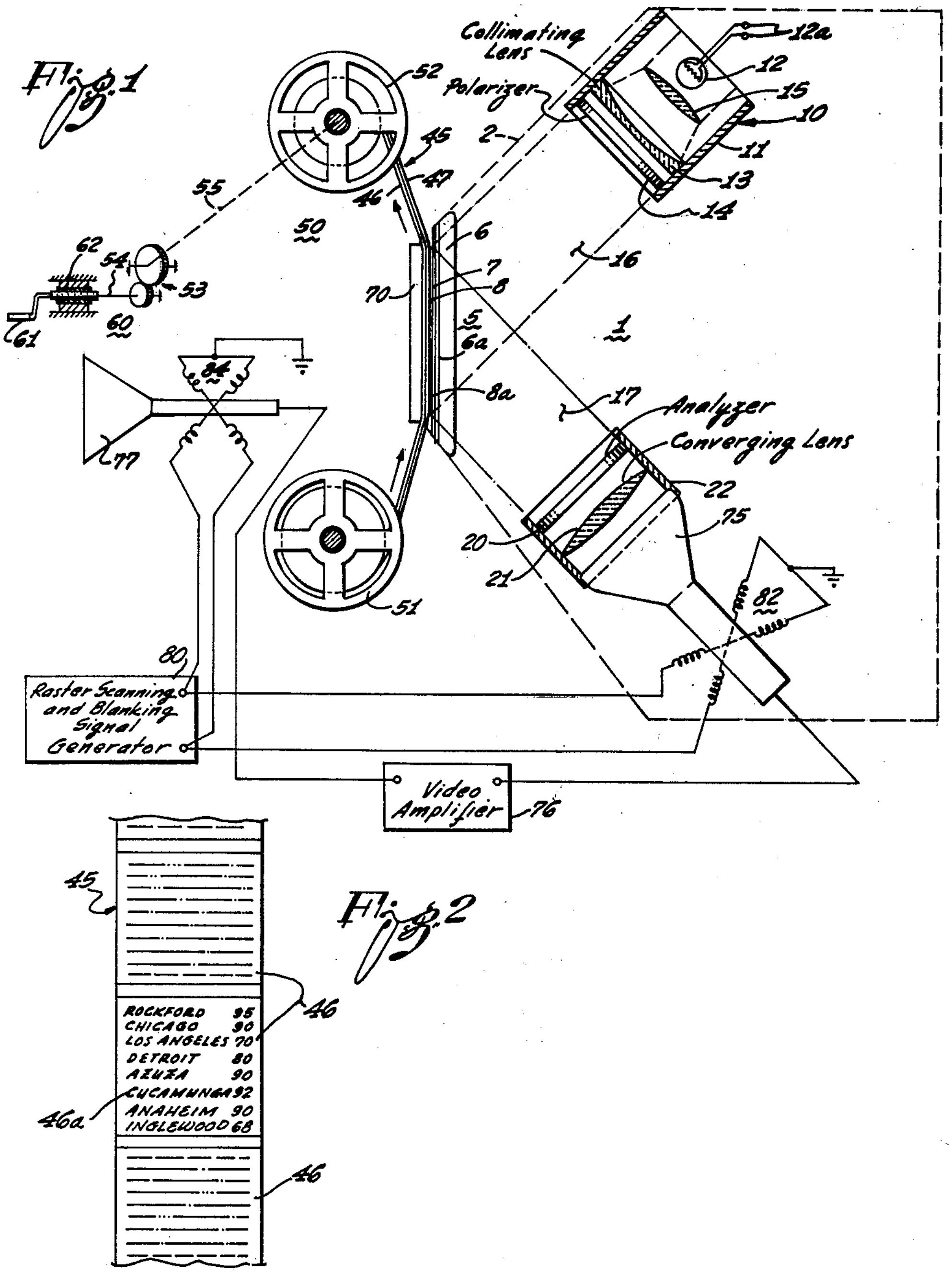

This invention pertains to facsimile systems and relates more especially to a magneto-optical method and system for producing a facsimile of an original scene represented, in turn, by a magnetic facsimile made up of a pattern of magnetic signals of positive and negative polarity in one-to-one relation with the respective elemental areas of the original scene.

Stated more fundamentally the method and transducer of this invention makes it possible to present for visible inspection a pattern of magnetic states representing a two-dimensional, multi-element image composed of relatively light and dark areas.

In general, this invention involves the application of the Kerr magneto-optical effect to rotate the major direction of polarization of the rays of a light beam reflected from the surface of a medium containing the magnetic facsimile. To achieve optical uniformity, minimize physical wear, and improve the signal-to-noise ratio of the video signal, a first material containing the magnetic facsimile is brought into magnetic relation with a thin magnetic film disposed over one surface of a transparent substrate. As a result, a copy of the magnetic facsimile is induced in the thin film. The light beam is disposed to flood the surface of the film contiguous to the substrate. The magnetic facsimile may comprise, for example, a section of magnetic tape wherein magnetic signals have been recorded by a suitable process. These signals have been recorded previously in one-to-one relation with the pattern of elemental light and dark areas, constituting the original scene.

The rotation of the major direction of polarization of rays of the light beam reflected from the surface of the thin magnetic film is a manifestation of the Kerr magneto-optical effect, a phenomenon first reported by John Kerr in 1877. In this regard, the Kerr *magneto-optical* effect should be distinguished from the more widely known Kerr *electro-optical* effect. The latter phenomenon involves rotation of the plane polarization of a polarized beam as the result of a double refraction which occurs in some materials when they are subjected to an electric field. The magneto-optical effect, however, occurs upon the reflection of a light beam from a magnetized surface. An explanation of this Kerr magneto-optical effect is set forth in the co-pending U.S. patent application of Alfred M. Nelson, Serial No. 124,676, filed July 17, 1961, and assigned to the same assignee as this application.

The magneto-optical method and transducer of this invention may be used in many important facsimile applications, especially those where the facsimile comprises a pattern of black and white picture elements. For example, an important application of this invention is an apparatus for reproducing text, sheets of data, etc., in the manner of conventional "microfilm" and "microcard" systems.

In recent years, it has become conventional practice in the television-facsimile art to achieve a magnetic-to-optical transduction of facsimile information by sensing inductively the magnetic representations of video, blanking, and line and frame synchronization signals recorded sequentially in successive transverse lines on a comparatively wide magnetic tape. Hence, the resulting pattern of magnetic signals does not have a one-to-one relation with the picture elements. Conventional pickup heads for sensing inductively video signals recorded on magnetic tape basically utilize a plurality of electrical conductors wound around a U-shaped magnetic core disposed in frictional relation against the magnetic coating of the tape. The external magnetic flux of the tape is intercepted by the core. As a result, a magnetic circuit is completed from one extremity of the core to the other, and the ensuing changes in magnetic flux linking the conductors induce electrical signals representing the magnitude and polarity of the magnetic signal states carried in the tape.

As a consequence of the frictional engagement between the pickup head and the tape, the magnetic coating of the latter is subjected to continuous wear, an unfavorable factor which becomes particularly acute in tape readers designed for sensing magnetic signals extending over the video frequency bandwidth. For example, to utilize the inductive sensing technique under these conditions, it has been found necessary to provide a tape reader having a rotatable pickup head which revolves around an axis aligned generally in the direction of tape movement. In operation, the pickup head is rotated at high speed so that the tape will be scanned transversely and repetitively as it passes by at a high linear rate.

It is the limitation in the density of the discrete magnetic signals recordable along a unit dimension of magnetic tape with existing techniques which makes it necessary to use a wide tape and a transversely rotating recording head for recording magnetic signals of video frequency. Inasmuch as a continuous physical contact must be maintained between the rotating head and the wide tape, from edge to edge, considerable tension must be applied to the tape. This tension, together with the high relative speed of movement between tape and rotating head increases the rate of frictional wear so greatly that the useful life of video tape seldom exceeds twenty-five playbacks.

Conventional magneto-electric transducers of the induction type are subject to several further disadvantages. Among these are impairment of operating characteristics as the result of oxide deposits built up in the gap on account of the dynamic friction between the head and oxide coating of the tape. A further disadvantage is the limitation in frequency and density of discrete magnetic signals which the pickup head can sense. This limitation arises from the necessity of making the contact surface of the pickup head great enough to "gather" enough magnetic flux from the tape to induce in the sensing conductors signal voltages of detectable amplitude and also because of the tendency of external magnetic flux from the tape surface immediately surrounding the contact area of the pickup head to seek the low permeability path through the head. These characteristics of conventional pickup heads also limit the density of magnetic signals which can be recorded and sensed along the transverse dimension of the tape.

From the foregoing, it should be understood that any pickup head which dispenses with the need for physical contact between head and tape surface, and which further eliminates the requirement for establishment of a magnetic circuit external to the signal-bearing area of the tape, would be free from the disadvantages inherent in the use of conventional heads of the inductive sensing type.

The possibility of realizing these advantages through use of the Kerr magneto-optical effect, has intrigued workers in the art. Instead of transporting the tape in rubbing relation with the exposed core surfaces of a conventional pickup, a successful application of the Kerr magneto-optical effect would make it possible to "read" the magnetic states distributed on the tape merely by focusing light on the magnetized surface. The light would not deform the external magnetic field of the tape. As a result, the frequency sensitivity of the pickup head, and the density of magnetic signal states per unit area could be increased enormously. Furthermore, the elimination of physical contact between the pickup surface and the tape surface would result in an important reduction in the rate of wear; and for the same reason, impairment of readout as the result of oxide build up would be obviated.

Although attempts previously have been made to utilize the Kerr magneto-optical effect in "reading" magnetic signals directly from magnetic tape, these attempts generally have been unsuccessful on account of variations in the optical characteristics of the tape surface. These variations, in the form of light scattering attributable to oxide particles, and other surface irregularities, impose an undesirable intensity modulation on the light reflected from the moving tape. It is impractical to manufacture tape having a magnetic coating with suitable optical characteristics for direct readout. Furthermore, a tape surface having acceptable optical characteristics at the time of manufacture would become impaired rapidly in the course of repetitive tape readings with existing equipment.

The transfer of magnetic signals from tape to magnetic film makes it easy to achieve a signal-bearing, magnetized surface having optimum optical characteristics for magneto-optical readout. It is comparatively easy, for example, to control the deposition of a thin magnetic film onto the smooth surface of a transparent substrate, but it is difficult to achieve a like degree of control during the manufacture of magnetic tape. Moreover, magneto-optical transduction occurs simultaneously with the induction of the magnetic signals from the tape to the film. Hence, it is unimportant whether the thin film has magnetic properties which enable it to retain a high degree of magnetization following exposure to the signal on the tape. It is necesary only that the thin film have a high permeability and a coercivity low enough to provide a good magnetic circuit for external flux in the vicinity of the tape surface.

In accordance with the embodiment of this invention described below, magneto-optical transduction is accomplished by simultaneously inducing into an adjacent thin magnetic film all of the magnetic signals carried by a unit length of tape representing, in one-to-one relation, the elemental picture areas of a facsimile. The remote surface of the thin magnetic film opposite the unit length of the magnetic tape is flooded with light. Although the incident light preferably is polarized linearly, unpolarized light may be used.

As explained above, this use of the Kerr magneto-optical effect makes it possible to produce an optical representation of the magnetic facsimile existing in the thin film in the form of corresponding rotations of the major direction of polarization of light rays reflected from each elemental magnetic signal through an angle greater or less than 180°. The resspective directions of of the resulting angles of rotation are determined by the polarities of the magnetic fields associated with the respective signal states of the magnetic facsimile. Accordingly, any rotation of the major direction of polarization of a ray following reflection, and resulting in a non-parallel relationship with a major direction of polarization which would exist in the absence of a magnetic signal, is translated into a change in light intensity determined by the direction of the rotation. The magnitudes of the resulting changes in intensities are proportional both to the respective amounts of reflected light and the amplitudes of the respective angles of rotation. The resulting pattern of light intensity variations is intensified and transduced into a time-varying series of electrical signals through use, for example, of an image orthicon.

Stated more succinctly, the method of this invention comprises the transfer to a thin magnetic film of a pattern of magnetic signal states, representing in one-to-one relation, respectively, elemental picture elements of an original scene; reflecting light, preferably linearly polarized, from the film; translating rotations of the major direction of polarization of components and other reflected light, and attributable respectively, to the strength and polarity of the magnetic signal states of the pattern, into corresponding light-intensity variations and displaying the light-intensity variations as a facsimile of the original scene.

The preferred embodiment of this invention described below in more detail, comprises a magneto-optical pickup head made up of a thin magnetic film disposed over the planar surface of a transparent substrate; a source of linearly-polarized, homogeneous, collimated light disposed to reflect light from one surface of the thin film; an analyzer disposed in the path of reflected light to translate variations in the major directions of polarization of reflected light components attributable, respectively, to the magnetic signal states of the thin film, into corresponding light intensity variations; a closed circuit television system for amplifying and displaying the light intensity variations as a facsimile of the original scene. To enhance and effectively amplify the magneto-optical effect, a transparent layer of dielectric material is disposed between the reflecting surface of the thin film and the substrate. The light source is disposed to direct light through the substrate and dielectric layer to the reflecting surface of the thin magnetic film. In this manner, a light reflecting surface of uniform, optimum, and virtually-permanent optical characteristics is sealed between the dielectric layer and the thin film. The magneto-optical pickup head is mounted to facilitate the establishment of a magnetic relationship between the pickup head and a magnetic tape having, for example, successive, longitudinally-displaced areas, each of which carries a pattern of magnetic signals representing, in one-to-one relation, the picture elements of an original scene.

Although the light source utilized in the embodiment described below is linearly polarized, it should be understood that magneto-optical transduction may be accomplished through use of a non-polarized beam. In this instance, polarization in a major direction which normally occurs upon reflection from any nonmagnetized surface, will be displaced angularly from the usual direction of polarization by the magnetic field, if any, at the reflecting surface.

It is well known that upon reflection of an un-polarized light beam, the components of the beam perpendicular to the plane of incidence will be reflected with greater intensity than components which are parallel to the plane of incidence. Hence, in the absence of a pattern of magnetic states, the reflected light will have a major direction of polarization parallel to the reflecting surface.

In accordance with the Kerr magneto-optical effect, however, this major direction of polarization will be displaced by each magnetic state through an angle having a direction determined by the polarity of their magnetic fields. Thus, the reflected light beam will carry an optical representation of the states of magnetization present at the reflecting surface in the form of a rotated major directions of polarization, each of which forms an acute angle with respect to the major direction of polarization which would exist in the absence of the magnetic states.

As explained above and described more fully below, these angular rotations may be detected, and then transduced into an electrical signal representing the presence, position, and polarity of the pattern of magnetic states at the reflecting surface; and the electrical signal may be utilized in producing a facsimile of the original scene represented by the pattern of magnetic states.

From the preceding paragraphs, it should be apparent that this invention provides a magneto-optical facsimile method and transducer which makes possible the production of facsimiles from magnetic recordings of a clarity and definition far superior to that obtainable with conventional equipment. In fact, the principal limitation on picture definition and contrast achievable with a method and apparatus in accordance with this invention is the maximum density at which discrete and detectable magnetic states may be formed in the tape or other record medium. Unlike conventional methods and apparatus, utilizing pickup heads of the inductive type, those in accordance with this invention are not subject to the limitations on magnetic signal density imposed by the magnetic characteristics of the material forming the core of the pickup head.

Moreover, practice of this invention makes it feasible to reproduce magnetic representations of original scenes recorded on magnetic tape, or other appropriate material, in a pattern of discrete magnetic signal states in one-to-one relation with corresponding elemental areas of the scene represented. In other words, each magnetic signal state has the same position among the magnetic states of the pattern as the elemental area it represents occupies among other elemental areas of the original scene. This makes it possible to eliminate the costly and unreliable tracking servos and control systems required in conventional facsimile reproducing systems. The significance of this improvement is that it results in an increase in reliability and a reduction in the cost of facsimile reproducers.

The foregoing paragraphs are intended to summarize and explain the significance of this invention in relation to the problems which it resolves, and should not be construed to narrow the scope of protection provided by the claims. For a more complete understanding of the structure, operation and novel features of this invention, consider the following description with reference to the drawings, wherein:

FIG. 1 is a schematic-block diagram representing the essential components of a preferred embodiment of this invention, and FIG. 2 represents a segment of a typical magnetic tape useful in the embodiment of FIG. 1, and bearing successive patterns of magnetic signals representing in one-to-one relation the elemental areas of an original scene.

A preferred embodiment of this invention represented in FIG. 1 generally comprises a magneto-optical transducer 1 disposed within an appropriate lightproof housing 2, a tape supply and takeup mechanism 50 for magnetic tape 45 bearing successively and longitudinally-spaced patterns 46 of magnetic signal states to be transduced into facsimiles of original scenes, and apparatus for intensifying the facsimiles, including a video camera tube 75, a video amplifier 76, a cathode-ray picture tube 77, and a raster scanning and blanking signal generator 80 coupled to the horizontal and vertical deflection coils 82 and 84 of the camera tube 75 and picture tube 77, respectively.

The magneto-optical transducer 1 generally comprises the magneto-optical pickup head 5, a light source 10 for producing a beam 16 of collimated, homogeneous, linearly-polarized light directed onto the magneto-optical pickup head 5, and an optical analyzer 20 disposed in the beam 17 of light reflected from the magneto-optical pickup head 5 to the video camera tube 75.

It should be understood that the housing 2 may be made of any appropriate materials and have any desired configuration without affecting the scope of this invention. It is desirable, however, that the housing 2 be lightproof in order to exclude spurious radiation which might reduce the signal-to-noise level in the output of the magneto-optical transducer 1. Likewise, the brackets and supports used for mounting the light source 10, the video camera tube 75, and other components of the magneto-optical transducer 1 within housing 2 may have any conventional form. Accordingly, it is considered unnecessary to represent and described the construction details of housing 2 and the support brackets for light source 10, video camera tube 75, and other components. It should be noticed, however, that the positional interrelationship of the light source 10, the magneto-optical pickup head 5 and the video camera tube 75 should approximate that represented in FIG. 1, the essential requirement in this arrangement being that the incident beam 16 be reflected from the magneto-optical pickup head 5 along a path toward the photosensitive surface within the video camera tube 75.

The magneto-optical pickup head 5 is comprised of a flat, transparent substrate 6 which provides physical support for a transparent layer of dielectric material 7 and an opaque reflecting layer of thin magnetic material 8 disposed in the order named in stacked relation on the planar surface 6*a* of the transparent substrate 6. The magneto-optical pickup head 5 may be mounted within an opening of housing 2 in any convenient manner.

The function of the dielectric layer 7 is to enhance the rotational effect of the magnetic signal states induced within thin film 8 on the major direction of polarization of the components of incident beam 16 impinging on areas of thin magnetic film 8 bearing a pattern magnetic signal states of various polarities. The transparent dielectric layer 8 may have a thickness of a few molecules, and is composed preferably of silicon monoxide. With some sacrifice in the degree of enhancement of the magneto-optical effect, zinc sulfide, bismuth, stannic oxide, and cadmium sulfide may be used in lieu of silicon monoxide. The amplification phenomenon is not understood fully. However, it appears from experimental evidence that the magnitude of amplification of the magneto-optical effect is related to the relative refractive index between the thin magnetic film 8 and the dielectric layer 7. In fact, it has been theorized that amplification will vary directly as a function of the relative index of refraction. In accordance with another hypothesis, the improvement resulting from use of the dielectric layer 7, is attributed to cancellation of "noise" components of the reflected beam 17 on account of optical interference between light reflected respectively from the surface of the dielectric layer 7 and the surface of the thin magnetic film 8.

The thin magnetic film 8 overlying the dielectric layer 7 may be comprised of iron, a nickel-iron alloy or any other highly-magnetizable material of low coercivity. This film may have a thickness of 500 to 2500 angstroms, but the important criterion is that the film thickness not exceed a single magnetic domain. A thickness of this dimension will provide a maximum sensitivity and response to the magnetic signal states present on tape 45.

The thin magnetic film 8 may be applied to the external surface of the dielectric layer 7 through the use of conventional vacum deposition techniques. It is desirable, however, to effect the deposition of the magnetic film under the influence of a magnetic field oriented in a direction parallel to the plane of incidence of the incident light beam 16 so that the "easy" direction of magnetization of the film will be parallel to the external fields of magnetic flux produced by the signal states carried by the magnetic tape 45. This will result in optimum values of coercivity for the magnetic film. Furthermore, this orientation in the "easy" direction of magnetization will make it possible to maximize the thickness of the film without exceeding the thickness of a single magnetic domain.

It appears unlikely that the thin magnetic film 8 must have a square-loop magnetization characteristic, because retention of the magnetic signal states induced in the film 8 from the tape 45 is unnecessary, if not undesirable. The principal requirement is that the thin magnetic film 8 be close enough to the tape 45 to enable the induction of the magnetic signal states carried by the latter into the former. Because magnetic signal states in the thin magnetic film 8 are read simultaneously with their induction from tape 45, it is unnecessary that the induced magnetic states be retained by the thin film 8.

The flat, transparent substrate 6 may be made, for example, of "Pyrex" glass or other materials having the requisite optical properties. Although the substrate 6 utilized in this embodiment of the invention has a flat rectangular configuration, it is possible that an arcuate configuration may be desirable for some applications especially those which are intended to produce various "special" optical effects, or to correct image distortions inherent in the operation of the system.

The light source 10 provides a beam 16 of collimated, homogeneous, linearly-polarized light having a cross sectional area commensurate with the area of a single pattern of magnetic signal states recorded on the tape 45. The light source 10 is comprised of a housing 11 containing a source of illumination 12, a collimating lens system 13, a plane-polarizing element 14, and a divergent lens 15. The source of illumination may be energized by electrical power supplied via terminals 12*a*. The light source 10 is supported preferably so that the angle of incidence of the beam 16 on the inner surface 8*a* of the thin magnetic film 8 is acute. Experimental results indicate that an angle of incidence of 60° will maximize the magneto-optical effect. Moreover, the plane-polarizing element 14 of light source 10 is oriented so that the electric intensity vector of the beam 16 will be perpendicular to the plane of incidence. It is desirable to mount the light source 10 and the video camera tube 75 closely as possible to the magneto-optical pickup head 5 in order to minimize beam spreading, light scattering, and consequent decreases in the signal-to-noise ratio in the output of the transducer 1.

The optical analyzer 20, interposed between the magneto-optical pickup head 5 and the video camera tube 75, is oriented so that its single plane of light transmission forms an acute angle, normally near but not equal to 90°, with respect to the plane of polarization of the incident light beam 16 supplied from light source 10. As a result, any rotation of the major direction of polarization of components of the reflected light beam 17 corresponding to the magnetic signal states present within the thin magnetic film 8 in the direction of cross polarization at 90° will have the effect of reducing the intensity of the light of these components passed by the analyzer 20, but rotations of other components in the opposite direction will increase the amount of light passed from these components through the optical analyzer 20.

Inasmuch as the direction of angular rotations of components of the reflected beam 17 will be determined by the respective polarities of the magnetic signal states present in the thin magnetic film 8, variations in the intensity of the light passed through the optical analyzer 20 above and below the reference level will represent the respective polarities of the magnetic signal states of the pattern currently being read. These fluctuations in the intensity of components of the reflected beam 17 then are focused by the lens 21 onto the photosensitive screen of the video camera tube 75, where they are scanned systematically and converted into an amplitude-modulated electrical current which can be amplified and displayed for easy visual observation on the face of the cathode-ray picture tube 77. The optical analyzer 20 and the focusing lens 21 are mounted in a support 22.

Inasmuch as the image-intensifying apparatus, including the video camera tube 75, the video amplifier 76, the cathode-ray picture tube 77, and the raster scanning and blanking signal generator 80, constitute a closed-circuit television system of conventional design, it is considered unnecessary to provide detailed drawings and descriptions of its components.

The essential components of the tape transport mechanism 50 include a supply reel 51 on which the magnetic tape 45 is stored prior to operation, a takeup reel 52 onto which the magnetic tape is wound during operation, a tape transport control mechanism 60, and a flat backing plate 70 for guiding the movement of magnetic tape 45 relative to the thin magnetic film 8 of the magneto-optical pickup head 5. Inasmuch as the tape transport mechanism 50 is conventional, it is considered unnecessary to represent their construction details or the manner in which they are supported. To do so would tend to obscure rather than clarify the invention.

The magnetic tape 45 is conventional, being comprised of an elongated plastic strip 46 coated on its upper surface with a layer of magnetizable material 47. A segment of the magnetic tape 45 represented in FIG. 2, portrays the manner in which the pattern of magnetic signal states is arranged in one-to-one relation with the elemental light and dark areas of an original scene. In this example the pattern 46*a* of magnetic signal states represents letters and numbers showing the maximum ambient temperatures of various cities on a given date. Hence, it should be apparent that the magnetic signal states representing black occupy the same position in the pattern recorded on tape 45 as the elemental areas which they represent occupy in the original scene. A succession of patterns of magnetic signal states may be recorded along the lenth of tape 45, and an operator of this embodiment may position any one of them in magnetic relation with the thin magnetic film 8 of the magneto-optical pickup head 5 for a visual presentation on the face of the cathode-ray picture tube 77.

The tape transport control mechanism 60, represented symbolically in FIG. 1, is comprised of a crank 61 mounted in an appropriate bearing 62 for turning the takeup reel 52 in a counterclockwise direction via the gear train 53 and mechanical linkages 54 and 55. It should be understood, of course, that the tape transport mechanism 60 of this embodiment is entirely conventional, and may include means for moving the tape 45 in either direction to facilitate location of a desired frame, or pattern, of magnetic signal states, or for rewind purposes. Moreover, it should be apparent that the tape transport mechanism 60 may be designed in accordance with conventional and well-known principles for intermittent movement, rather than continuous movement of the type provided by the mechanism represented in FIG. 1.

It should be noticed that the backing plate 70 may be positioned so that the magnetizable layer 47 of the tape 45 will move in physical contact with the surface of the thin magnetic film 8 of the magneto-optical pickup head 5. Alternatively, the backing plate 70 may be positioned so that a narrow gap will be formed between the tape 45 and the thin film 8. Where the former expedient is adopted, it may be found desirable to minimize wear attributable to friction by coating the thin magnetic film 8 with a layer of chromium, rhodium or other hard, smooth, wear-resistant material. If, on the other hand, it is desired to obviate the problem of physical wear by establishing a narrow gap between the adjacent surfaces of tape and thin film, the spacing must be kept small enough to insure the induction of magnetic signal states of adequate strength from the tape 45 into the thin magnetic film 8.

It should be apparent from the foregoing that this invention provides a method and apparatus characterized by a marked reduction in the number of moving parts required, and a consequent increase in reliability, comparatively low manufacturing and maintenance cost, greatly improved picture clarity and definition, and an ease of operation comparable with that of the well-known "microcard" and "microfilm" systems. In fact, all that is required to operate a facsimile reproducer of the type disclosed, is to energize the apparatus, and then turn the tape-transport mechanism 60 until the facsimile or facsimiles containing the desired information have been located.

The representations in the drawings and the foregoing text are intended merely to facilitate the practice of this invention by person skilled in the art, not to restrict its scope. Moreover, it is obvious that many variations and substitutions may be made with respect to the embodiment described above while remaining within the scope of this invention as set forth in the following claims.

What is claimed is:

1. A reproducer utilizing a magneto-optical effect for transducing successive groups of magnetic signal states recorded in a magnetizable material into information represented by the signal states, the reproducer including:

a thin magnetic film disposed in magnetic relation with the magnetizable material to simultaneously reproduce successive groups of the magnetic signal states on the thin film, a source of light disposed to reflect light from an area of the thin film having one of the groups of magnetic signal states recorded on the thin film, so that the reflected light will have components polarized in directions dependent upon the magnetic states of the area, and means disposed in the path of the reflected light components for translating rotations of the major direction of polarization of the components into the information represented by the pattern of the magnetic signal states.

2. Reproducing apparatus utilizing a magneto-optical effect for reproducing multi-element information recorded as a pattern of magnetic signal states in a magnetizable material in a particular direction, the apparatus including:

a substrate having a surface disposed in proximate relation to a surface of the magnetizable material, a thin magnetic film disposed on the surface of the substrate and in magnetic proximity to the pattern of magnetic signal states on the magnetizable material to simultaneously reproduce a plurality of the magnetic signal states in the particular direction on the thin film, a source of light disposed relative to the thin magnetic film to illuminate at least a particular portion of the thin magnetic film coextensive with at least the plurality of magnetic signal states and to obtain a polarization of the light by the thin magnetic film in accordance with the pattern of the magnetic signal states recorded on the thin magnetic film, means for obtaining a relative movement between the magnetizable material and the thin magnetic film in the particular direction, and means disposed in the path of light reflected from the particular portion of the thin magnetic film and responsive to variations in the responsive major directions of light polarization of the light from the thin magnetic film for reproducing the information represented by the pattern of the magnetic signal states.

3. A reproducer utilizing a magneto-optical effect for reproducing the information represented by a plurality of magnetic signal states recorded at successive positions in a particular direction in a magnetizable material, the reproducer including:

a thin magnetic film disposed in magnetic relation with the magnetizable material to simultaneously reproduce a plurality of the magnetic signal states in the particular direction on the thin magnetic film, means for obtaining a relative movement of the thin magnetic film and the magnetizable material in the particular direction past the thin magnetic film, a source of homogeneous, collimated light disposed to reflect light from an area of the thin film reproducing a plurality of magnetic signal states, so that the reflected light will have components polarized in directions dependent upon the magnetic signal states of the area, and means disposed in the path of the reflected light components for translating rotations in the major direction of polarization of the components of the reflected light into the information represented by the plurality of magnetic signal states.

4. A reproducer utilizing a magneto-optical effect for reproducing the information represented by a pattern of magnetic signal states recorded in a magnetizable material in a particular direction and having tracks of magnetic signal states in directions transverse to the particular direction, the reproducer including:

a thin magnetic film disposed in magnetic proximity to the magnetizable material to obtain the reproduction of the signal states on the thin magnetic film in the different tracks on the magnetizable material, means for obtaining a relative movement between the magnetizable material and the thin magnetic film in the particular direction, a source of homogeneous, collimated, and polarized light disposed relative to the thin film to reflect light from an area of the thin film having a plurality of magnetic signal states corresponding to different tracks of information, so that the reflected light will have components polarized in directions dependent upon the magnetic states of the area, and means disposed in the path of the reflected light components for translating rotations in the major direction of polarization of the components of light into the information represented by the magnetic signal states in the different tracks.

5. Apparatus utilizing a magneto-optical effect for reproducing information recorded as a pattern of magnetic signal states in a magnetizable material in a particular direction where the magnetic signal states are recorded in tracks having a direction transverse to the particular direction, the apparatus including:

a transparent substrate having a surface disposed in proximate relation to a surface of the magnetizable material, a transparent layer of dielectric material disposed on the surface of the substrate, a thin magnetic film disposed on the dielectric layer and in magnetic proximity to the pattern of magnetic signal states to form a composite laminar coating for reproducing on the thin magnetic film different tracks of the magnetic signal states and for obtaining a magneto-optical transducing of the magnetic signal states reproduced on the thin magnetic film, a source of light disposed relative to the thin magnetic film to illuminate at least a particular portion of the thin film coextensive with at least a plurality of magnetic signal states in different tracks on the thin magnetic film, means for producing a relative movement of the magnetizable material and the thin magnetic film in the particular direction, and means disposed in the path of light passing from the particular portion of the thin magnetic film and responsive to variations in the respective major directions of light polarization of the reflected light dependent upon the polarity of the magnetic signal states for reproducing the information represented by the magnetic signal states.

6. Apparatus utilizing a magneto-optical effect for reproducing information recorded as a pattern of magnetic signal states in a particular direction in a magnetizable material, the apparatus including:

a transparent, planar substrate having a surface disposed in proximate relation to the magnetizable material, a thin magnetic film disposed on the surface of the substrate and in magnetic relation to the pattern of magnetic signal states to reproduce the magnetic signal states on the thin film, means for producing a relative movement between the magnetizable material and the thin magnetic film in the particular direction, a source of light disposed relative to the thin magnetic film to illuminate at least a particular portion of the thin film coextensive with at least a plurality of magnetic signal states in the particular direction and to provide a polarization of the light, and means disposed in the path of light polarized by the particular portion of the thin magnetic film and responsive to variations in the respective major directions of light polarization for reproducing the information represented by the magnetic signal states.

7. Apparatus utilizing a magneto-optical effect for reproducing the information recorded as a pattern of magnetic signal states in a magnetizable material where the magnetic signal states are recorded in a particular direction as tracks extending in a direction transverse to the particular direction, this apparatus including:

a thin magnetic film having a surface area coextensive with the magnetic signal states in a plurality of successive tracks on the magnetizable material to reproduce such magnetic signal states on the thin magnetic film, means for mounting the thin film in magnetic relation with the pattern of magnetic signal states on the magnetizable material so that a magnetic copy of the pattern of the magnetic signal states in the successive tracks will be induced into the thin film, means for producing a movement of the magnetizable material relative to the thin magnetic film in the particular direction, means for flooding the thin magnetic film with light to obtain a polarization of the light passing from the thin magnetic film in accordance with the polarization of the magnetic signal states, and means disposed in the path of the light passing from the thin magnetic film for translating rotations of the light in the major directions of polarization of the light into the information represented by the magnetic signal states.

8. Apparatus utilizing a magneto-optical effect for reproducing the information recorded as a pattern of magnetic signal states in a magnetizable material where the magnetic signal states are recorded in a particular direction and in successive tracks in a direction transverse to the particular direction, the apparatus including:

a thin magnetic film having a surface area coextensive with the pattern of magnetic signal states in a plurality of successive tracks on the magnetizable material to obtain a reproduction on the thin magnetic film of the magnetic signal states in the successive tracks on the magnetizable material, means for mounting the thin magnetic film in magnetic proximity with the pattern of magnetic signal states on the magnetizable material so that the magnetic pattern of the magnetic signal states in the successive tracks on the magnetizable material will be induced into the thin film, means for flooding an exposed surface of the magnetic film with homogeneous and collimated light to obtain a polarization of the light in accordance with the polarity of the magnetic signal states, means for obtaining a movement of the magnetizable material in the particular direction, and means disposed in the path of the polarized light passing from the thin magnetic film for translating rotations of the light in the major direction of polarization into the information represented by the magnetic signal states.

9. A facsimile reproducer utilizing a magneto-optical effect for transducing into an optical facsimile a pattern of magnetic signal states recorded in a particular direction in a magnetizable material and representing elemental picture areas of an original scene, the reproducer including:

a thin magnetic film disposed in magnetic relation with the magnetizable material to reproduce the magnetic signal states from the thin film, a source of light disposed relative to the thin film to reflect simultaneously from the thin film at least two components of light having major directions of polarization dependent upon at least two magnetic states of the thin film, means operatively coupled to the magnetizable material for obtaining a movement of the magnetizable material in the particular direction, means disposed in the path of the reflected light components to translate rotations of the respective major directions of polarization of the reflected components in each of two opposite directions into corresponding variations in the respective intensities of the light components, and further means including light-responsive means in the path of the translated light components for displaying the variations in intensity as a facsimile of the original scene.

10. A facsimile reproducer utilizing a magneto-optical effect for transducing into an optical facsimile a pattern of magnetic signal states recorded in a magnetizable material and representing elemental picture areas of an original scene, the reproducer including:

a thin magnetic film mounted for disposition in magnetic relation with the magnetizable material to reproduce on the thin film the magnetic signal states on the magnetizable material, a source of light disposed relative to the thin film to reflect simultaneously from the thin film components of light having major directions of polarization dependent upon the magnetic states in successive tracks on the thin film, means operatively coupled to the magnetizable material for obtaining a movement of the magnetizable material in the particular direction along the thin film, means disposed in the path of the reflected light components to translate rotations of the respective major directions of polarization of the reflected components of light in two opposite directions into corresponding variations in the respective intensities of the light components, a photoelectric transducer in the path of the translated light components for producing electrical signals representing the light intensity variations, and means operatively coupled to the photoelectric transducer for producing a facsimile of the original scene in response to the electrical signals.

11. A facsimile reproducer utilizing a magneto-optical effect for transducing into an optical facsimile a pattern of magnetic signal states recorded in a magnetizable material and representing elemental picture areas of an original scene, the reproducer including:

a thin magnetic film mounted for disposition in magnetic relation with the magnetizable material to reproduce on the thin film the magnetic signal states on the magnetizable material, a source of light disposed relative to the thin film to reflect simultaneously from the thin film components of light having major directions of polarization dependent upon the magnetic states in successive tracks on the thin film, means operatively coupled to the magnetizable material for obtaining a movement of the magnetizable material in the particular direction along the thin film, means disposed in the path of the reflected light components to translate rotations of the respective major directions of polarization of the reflected components of light in two opposite directions into corresponding variations in the respective intensities of the light components, a photoelectric transducer in the path of the translated light components for producing electrical signals representing the light intensity variations, and means operatively coupled to the photoelectric transducer for producing a fasimile of the original scene in response to the electrical signals.

References Cited by the Examiner

UNITED STATES PATENTS

| | | | |
|---|---|---|---|
| 2,560,430 | 7/51 | Friend | 340—174.1 |
| 2,616,962 | 11/52 | Jaffe | 178—7.92 |
| 2,984,825 | 5/61 | Fuller et al. | 340—174.1 X |

DAVID G. REDINBAUGH, *Primary Examiner.*

ROY LAKE, *Examiner.*